(12) United States Patent
Alstrin et al.

(10) Patent No.: US 9,507,350 B2
(45) Date of Patent: Nov. 29, 2016

(54) DEVICE AND METHOD FOR CONTROLLING A FLUID ACTUATOR

(71) Applicant: Eaton Corporation, Cleveland, OH (US)

(72) Inventors: Kevin E. Alstrin, Waconia, MN (US); Peter Lauer, Eden Prairie, MN (US); Bert W. Robb, Clear Lake, MN (US)

(73) Assignee: Eatonc Corporation, Cleveland, OH (US)

( * ) Notice: Subject to any disclaimer, the term of this patent is extended or adjusted under 35 U.S.C. 154(b) by 365 days.

(21) Appl. No.: 14/089,301

(22) Filed: Nov. 25, 2013

(65) Prior Publication Data

US 2014/0156089 A1    Jun. 5, 2014

Related U.S. Application Data

(62) Division of application No. 12/710,039, filed on Feb. 22, 2010, now Pat. No. 8,594,852.

(51) Int. Cl.
    *G05D 7/06* (2006.01)
    *F15B 21/08* (2006.01)
(52) U.S. Cl.
    CPC ............ *G05D 7/0635* (2013.01); *F15B 21/08* (2013.01)
(58) Field of Classification Search
    None
    See application file for complete search history.

(56) References Cited

U.S. PATENT DOCUMENTS

| 4,807,516 | A | 2/1989 | Takats |
| 5,251,148 | A | 10/1993 | Haines et al. |
| 5,339,665 | A | 8/1994 | Yoshikawa |
| 5,422,808 | A | 6/1995 | Catanese, Jr. et al. |
| 5,500,580 | A | 3/1996 | Tranovich |
| 5,659,485 | A * | 8/1997 | Lee ..................... F04B 49/065 60/487 |
| 5,806,565 | A | 9/1998 | Kadlicko |
| 6,356,811 | B1 | 3/2002 | Beselt |
| 6,442,534 | B1 | 8/2002 | Au et al. |
| 6,901,315 | B2 | 5/2005 | Kockemann |
| 2001/0037159 | A1 | 11/2001 | Boger et al. |

(Continued)

FOREIGN PATENT DOCUMENTS

| DE | 19530935 A1 | 2/1997 |
| DE | 29717042 U1 | 11/1997 |

(Continued)

OTHER PUBLICATIONS

English Abstract for JP 2008144636A.

(Continued)

*Primary Examiner* — Sean Shechtman
(74) *Attorney, Agent, or Firm* — Fishman Stewart PLLC

(57) ABSTRACT

A hydraulic actuator control system for controlling the motion of a master actuator and at least one slave actuator may include an external supervisory computer for sending command signals. A hydraulic control system may be connected to the master actuator and the supervisory computer. The hydraulic control system may include a microprocessor and a master hydraulic control valve for controlling the flow of a pressurized fluid to the master actuator based on the command signals. The hydraulic actuator control system may include at least one slave actuator having at least one slave sensor connected to the microprocessor and having at least one slave control valve for controlling the flow of pressurized fluid to the slave actuator. The slave control valve and the slave sensor may be controlled by the microprocessor.

19 Claims, 3 Drawing Sheets

(56) References Cited

U.S. PATENT DOCUMENTS

2008/0269951 A1   10/2008  Boger
2010/0211227 A1    8/2010  Arbter et al.

FOREIGN PATENT DOCUMENTS

| DE | 19736581 A1 | 4/1998 |
| DE | 29522027 U1 | 4/1999 |
| JP | H0788520 A | 4/1995 |
| JP | 2008144636 A | 6/2008 |
| WO | WO-2008/119306 A1 | 10/2008 |

OTHER PUBLICATIONS

English Abstract for JP H0788520A.
espacenet English Abstract for DE19530935 A1 (1 page).
espacenet English Abstract for DE19736581 A1 (1 page).
Leutner V et al.; "Elektronic In Der Fluidtechnik," O + P Olhydraulic Und Pneumatik, Vereinigte Fachverlage, mainz, DE, vol. 42, No. 6; Jan. 1, 1998.
International Search Report, PCT/US2011/025666, Jul. 6, 2011.
Office Action for corresponding Chinese application No. CN 201180014950.4 dated Jul. 30, 2014.

\* cited by examiner

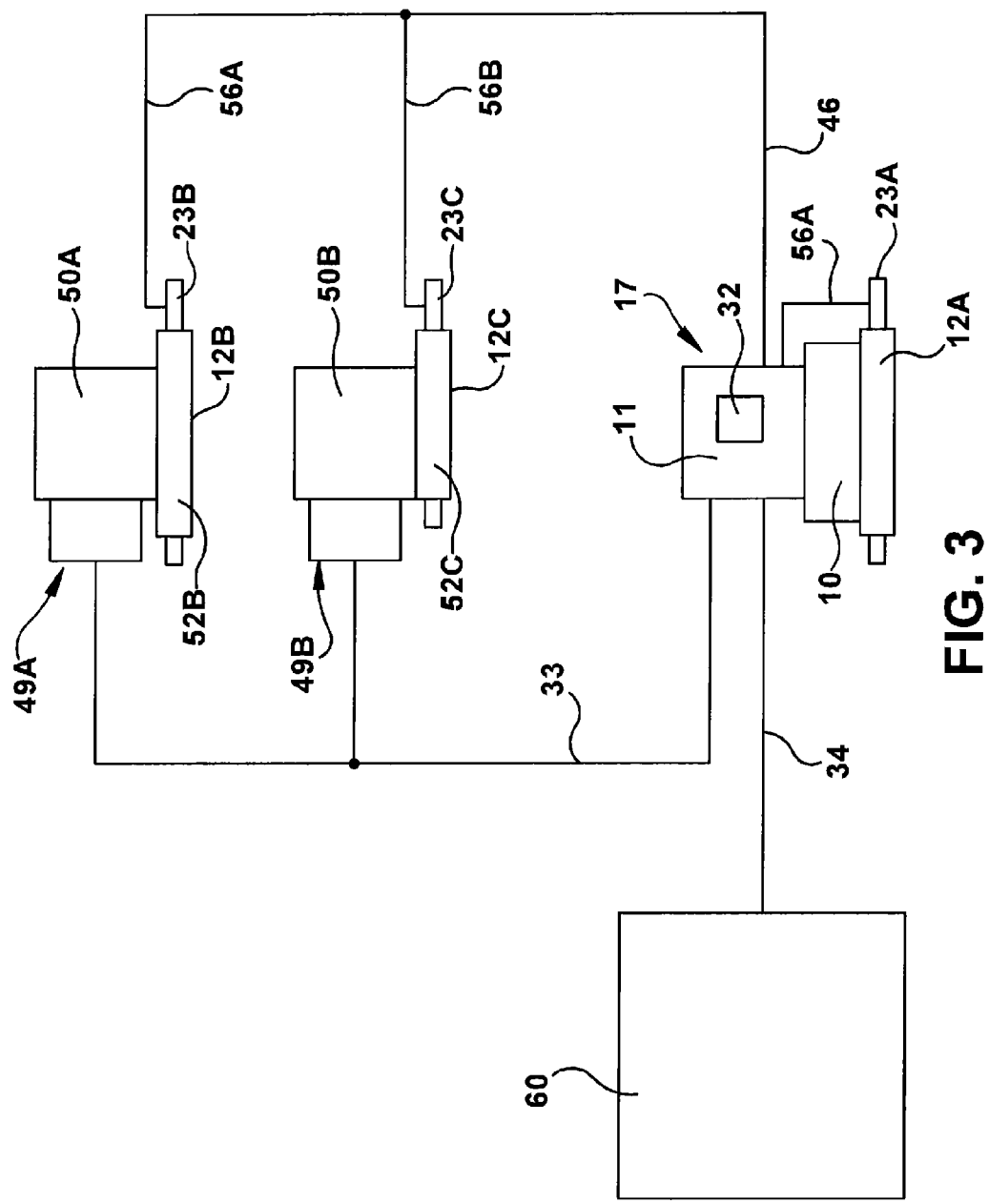

DEVICE AND METHOD FOR CONTROLLING A FLUID ACTUATOR

This application is a divisional application of U.S. patent application Ser. No. 12/710,039, which is hereby incorporated by reference in its entirety.

TECHNICAL AREA

A hydraulic actuator control device for implementing a distributed control architecture for regulating the performance of one or more hydraulic actuators according to command signals from a single, on-board, user programmable microprocessor.

PRIOR ART

A device for controlling a hydraulic actuator is disclosed in DE 195 30 935 C2. Disclosed in this reference is a displacement sensor for indicating the position of the valve piston with an electrical signal which is supplied to a position controller. The controller for controlling the position of the valve piston is arranged in its own housing, which is mounted on the housing of the valve. The controller ensures that the valve piston follows a position set point, which is supplied to the controller as an electrical input variable. In this case, the position of the valve piston determines the magnitude of the passage cross-section of the valve to control fluid flow to and from an actuator such as a hydraulic cylinder.

U.S. Pat. No. 6,901,315 to Kockemann discloses a controller device for controlling a hydraulic actuator which includes an electrically operated hydraulic control valve that controls the flow of a pressure medium in the actuator in response to the signals generated by three separate controllers. The first controller regulates the position of a piston in the control valve. The second controller commands movement of the actuator (such as a hydraulic cylinder). And a third controller electronically controls a sequence of movements of the actuator. The three controllers are arranged in a common housing which is mounted on the control valve. The first and second controllers are pre-programmed by the manufacturer of the control device. In this device, only the third controller can be freely programmed by the user. This prior art device does not allow the user to program the second controller with a state feedback control algorithm for controlling the hydraulic actuator. Also, in this prior art device, there is no capability to control slave actuators using a user programmed state feedback control algorithm in the device as disclosed and claimed. Also, in this prior art device, there is no capability to receive and process the input from a variety of external sensors or devices such as slave valves. Also, in this prior art device, all controllers are comprised of separate micro-processors or electrical circuits rather than being integrated into a single micro-controller.

The prior art control architecture, hereafter referred to as a "centralized control architecture", consists of a single PLC that is responsible for coordinating the movements of all hydraulic axes. This necessitates the need of all sensor signals to be routed to the single machine PLC. This also necessitates the need for this single PLC to simultaneously run several state feedback, closed-loop control algorithms for all of the hydraulic axes. The single machine PLC then sends a command or manipulation to each hydraulic control valve. The drawbacks of the prior art centralized control architecture are that it results in significant cost to route cabling throughout the machine and significant wiring complexity in the PLC panel. Furthermore a costly, high end PLC is required to simultaneously coordinate all of the hydraulic axes and run the several state feedback control algorithms at a sufficient control rate to achieve required dynamic performance of each hydraulic axis.

Also in the prior art as an improvement to a "centralized control architecture" is where the analog interfacing of all sensors and control valves with the PLC has been replaced by a field bus or network in some prior art installations. This installation can reduce cabling cost and wiring complexity because several nodes can be connected to the PLC in a ring topology. The drawback to this variation of a centralized control architecture with digital communication between nodes and PLC is that control update rates are now limited by the bandwidth of the field bus or network. Considering that all nodes need to continuously broadcast their feedback values in the form of 8 to 16 bit words and considering that the PLC needs to continuously broadcast manipulations to the control valves in the form of 8 to 16 bit words means that the rate at which information can be transferred is limited by the constant bandwidth of the field bus or network. The end result is that the performance of the hydraulic axis suffers from the latency of manipulations received from the central controller.

SUMMARY

The solution to these problems is to employ a "distributed control architecture" of the type disclosed in this application where the state feedback control algorithm for each hydraulic axis is executed locally on the hydraulic valve controlling that specific axis. The advantage of the "distributed control architecture" is that the sensors can be connected directly to the relevant hydraulic control valve and no longer take up valuable bandwidth on the field bus or network. Furthermore, the hydraulic control valve can generate its own command trajectory locally rather than needing to receive it from the central PLC which further reduces data transfer on the network or field bus. Since state-feedback control algorithms are embedded on the microprocessor of the hydraulic controller 10, the control instructions can be executed and a much higher rate thereby significantly improving the dynamic performance of said hydraulic axis. Lastly, the responsibilities of the central PLC get significantly simplified allowing the use of a less complex and lower cost unit. The new central computer becomes a supervisory PLC that coordinates the movements of each hydraulic axis but no longer needs to continually monitor and continually manipulate each hydraulic axis. Instead the supervisory PLC would transmit a "Start Profile" bit to a distributed controller. The distributed controller would receive this "Start Profile" bit, then execute its profile then respond with a "Profile Complete" bit. The new supervisory PLC would monitor the state and fault status of each distributed controller and take appropriate action if any distributed controller raises a fault flag. The network or field bus communication traffic in a distributed control architecture gets reduced from the continuous broadcast of digital sensor words and digital manipulation words to the periodic broadcast of state and fault bits.

In addition, the configuration of the exemplary hydraulic control system allows the micro processor based control algorithms to be programmed by the user and not exclusively by the manufacturer. This permits more flexibility in programming and protects the intellectual property of the user.

BRIEF DESCRIPTION OF THE DRAWINGS

FIG. 3 is a schematic representation of the exemplary fluid control device connected to a series of slave actuators;

DETAILED DESCRIPTION

Figure 1:
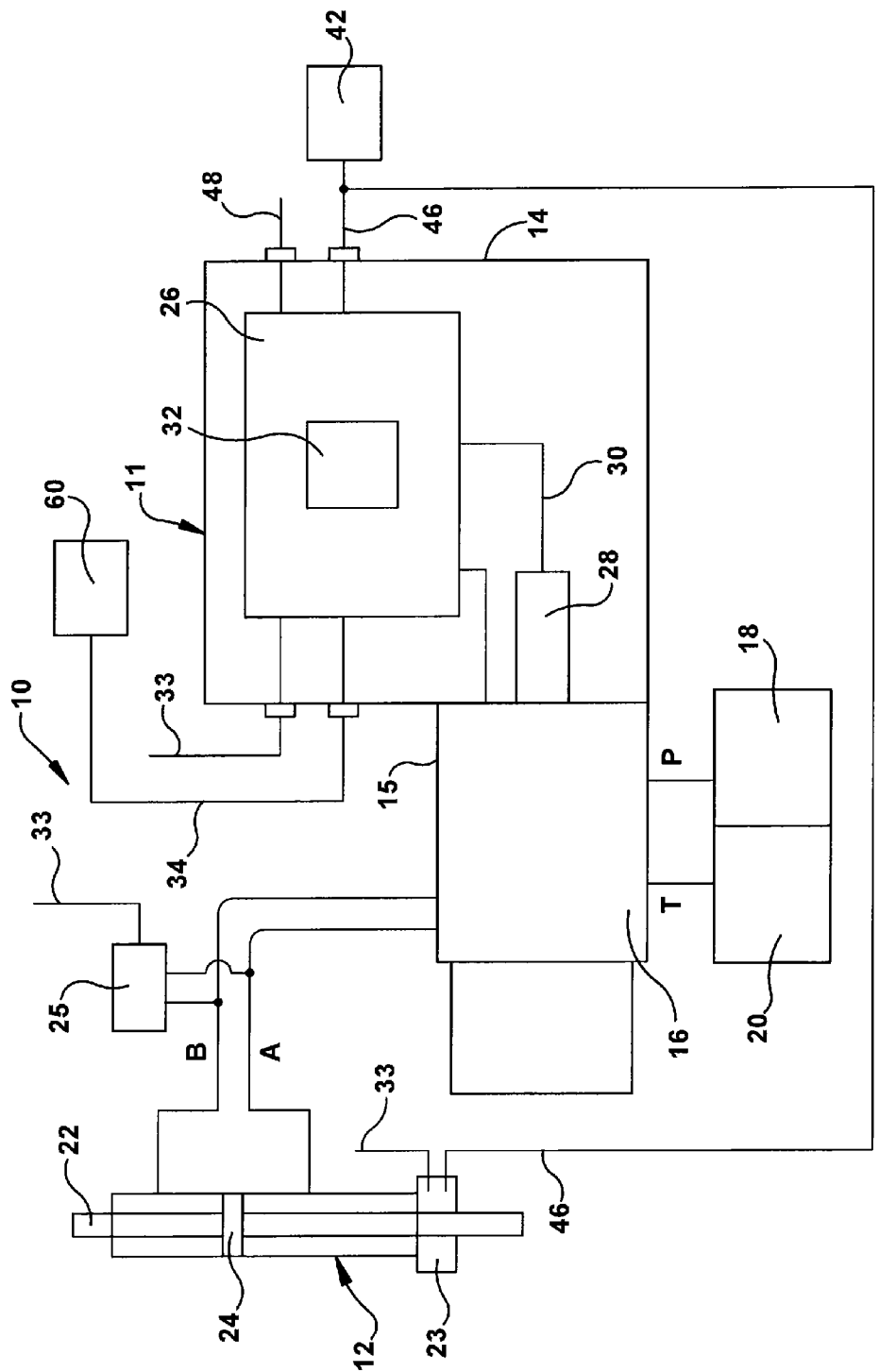
FIG. 1 is a schematic illustration of the exemplary fluid control device connected to a hydraulic actuator.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 2:
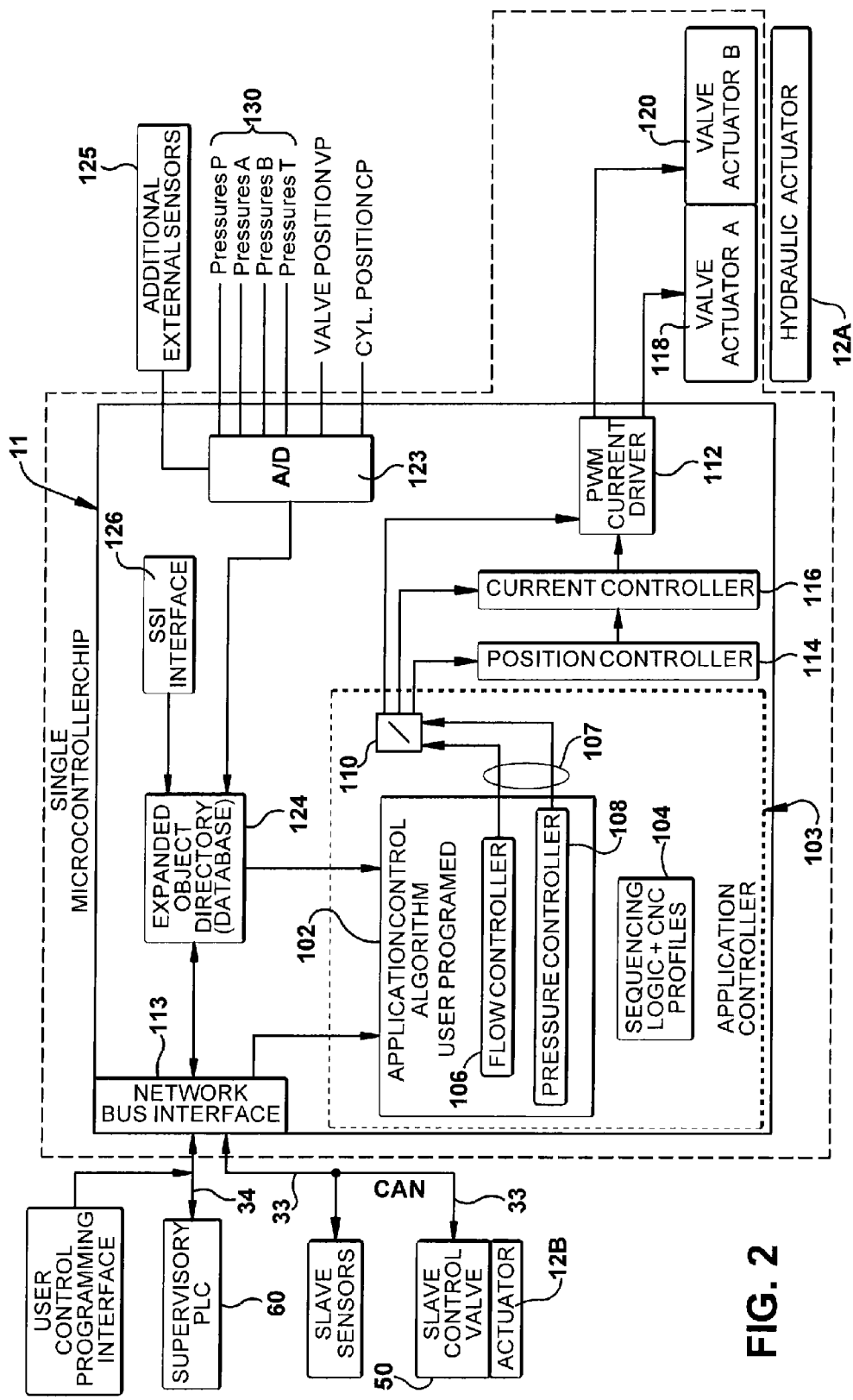
FIG. 2 is a schematic illustration showing the arrangement of the modules in the control circuit board and various inputs and outputs.

FIG. 1 shows a schematic view of a control device 10 for controlling a hydraulic actuator 12. A housing 14 is mounted to a hydraulic control valve 16. The control valve 16 is illustrated as a perspective view from the side. The control valve 16 controls the flow of working fluid such as hydraulic oil, that is pressurized from a pump 18, through the control valve 16 and ultimately to a hydraulic actuator 12 and back from the actuator 12 to a return tank 20. In the exemplary embodiment, the actuator 12 is a hydraulic cylinder which, in FIGS. 1, 2 and 3, is illustrated as a double-ended cylinder but could be any type of suitable actuator. For example, the actuator 12 may be a differential cylinder or a hydraulic motor. The hydraulic hose or tube connections from the control valve 16 to the actuator 12 are designated by the pump connection P for connection to the pump 18, tank connection T for the connection from the control valve to the tank 20 and A and B for the hose or tube connections from the control valve to the double-ended cylinder actuator 12. A displacement sensor 28 for measuring the position x of a shuttle or a spool valve (not shown) or other type of valving device is contained within the control valve 16. The displacement sensor 28 is connected into the controller circuit board 26 which converts the position x of the valve piston into an electrical signal xi which, in the controller 11 is processed and supplied as the processed position of the actual value of the spool position. The software functionalities within the microprocessor 32 together with input and output interfaces and other features of the controller 11 are discussed in more detail with regard to FIG. 2.

Now again referring to FIG. 1 of the drawings, a schematic illustration of the exemplary hydraulic control device 10 hydraulically connected to a hydraulic actuator 12 is shown. A housing 14 containing a controller 11 is mounted to a hydraulic control valve 16. The control valve 16 is illustrated in a perspective view from the side. The control valve 16 controls the flow of pressurized hydraulic oil or other working fluid from a pressure pump 18 through pressure line P to the hydraulic actuator 12 and back to a holding tank 20 via tank line T. In FIG. 1 the hydraulic actuator 12 is shown as a double acting hydraulic actuator having an output shaft 22 which is driven in one direction and in the opposite direction by pressurized fluid acting on either side of a piston 24 which is connected to the output shaft 22. Internally, the control valve 16 contains at least one high speed electromagnetic actuator (not shown) which receives and reacts to signals from the controller 11 to position the spool within control valve 16. The control valve 16 can use staged spool valves where a first spool valve is used to control the flow of pressurized hydraulic fluid to a second spool valve and so on, until the final stage controls the flow of pressurized hydraulic oil to an actuator such as a cylinder or motor where in FIG. 1 a cylinder actuator 12 is shown.

Referring again to FIG. 1, shows the block circuit diagram of the controller 11 illustrated in FIG. 1 for controlling the double-ended cylinder 12. The controller 11 for controlling the position x of the control valve and consequently the position of the piston of the actuator 12 is supplied with the output signal xi from the displacement sensor 28 as actual value, and a set point xs, as input signals to the controller 11 using this signal along with a position or pressure signal from the actuator 12 to provide a closed loop control system for controlling the performance of the actuator 12. The output stage of the controller 11 supplies the coils of the electromagnetic actuators contained in the control valve 16 with the currents ia and ib, which serve to position the spool to control the flow of pressurized hydraulic oil or other pressurized fluid to the actuator 12 through fluid lines A and B so as to move the actuator piston 24 so as to assume the position predefined by the signal xs in order that the actual value of the position of the actuator piston 24 or piston rod 22 follows its desired set point as quickly as possible. Importantly, the controller 11 is based upon a micro-chip or micro-controller 32 that is freely programmable by a user via the communication line 48 or 34 which can be also programmed by the manufacturer if desired.

The fluid connections A and B between the valve actuator 16 and the double-ended cylinder 12 are connected via commonly used hydraulic connection lines and fittings. The piston rod 22 of the double ended cylinder 12 is provided with a displacement sensor 23 which converts the position of the piston rod 22 into an electrical signal si Cp. The signal si Cp is supplied to the controller 11 and specifically to the microprocessor 32 as an actual position value. By differentiating the signal xi Cp, the actual value of the speed of the piston rod 22 of the double ended cylinder actuator 12 can be obtained as required for speed control if required. Pressure sensors 25 integral to the control valve 16 measure the pressure in the work port lines A and B as well as in the interface lines P and T and supply signals Pa, Pb, Ps, and Pt to the controller 11. In addition to the signals Pa, Pb, Ps, and Pt the controller 11 is supplied with the actual value xi of the position of the valve piston from the position sensor 28. From the weighted pressure difference between the signals Pa and Pb an actual pressure value pi which is also a measure of the force acting on the piston rod 22 of the double ended cylinder actuator 12 can be calculated. Interface pressures Ps and Pt can also be used in conjunction with port pressures Pa and Pb and with valve piston position xi to calculate the flow into or out of the cylinder actuator 12. The controller 11 is constructed as a single microprocessor 32 and is part of a closed loop digital control system. The microprocessor 32 is therefore capable of processing the algorithms of the pressure or flow control to ultimately control the fluid pressure supplied to the cylinder actuator 12 in addition to the algorithms for the position control of the piston rod 22 of the cylinder actuator 12. Instead of the position control described, speed control, force control or pressure control can also be implemented by the digital controller 11. The device provides a platform for the end user to program their own state feedback control algorithms and their own sequencing logic and command profiles directly into the single microprocessor 32. Alternatively this control software can be programmed by the manufacturer. In addition to the position control described any other application control conceivable to the user can be programmed into the controller 11 including but not limited to:

pQ pump control
pQ cylinder control
Load sensing pump control
Single axis control
Pressure and temperature compensated flow control
Pressure control
Synchronous axis control (master/slave)
Twin spool Meter in/Meter out control (master/slave)
Parallel flow control
Control of safety shutoff(s)
Prognostics & Diagnostics (valve and machine related)

The controller 11 is centered around the microprocessor 32 which is a freely programmable sequence controller with NC and/or PLC functionality. In this case, NC is the designation used in machine control systems for "numeric control", and PLC is the designation used for "programmable logic controllers". The microprocessor 32 also provides a platform for freely programmable state feedback control algorithms. The programming of the microprocessor 32 can be carried out by the user to protect the intellectual property of the user from outside entities. Many OEM's that utilize hydraulic valves to control hydraulic axes on machines want to protect their intellectual property in the area of hydraulic axis control. They consider the control of the hydraulic axis to be their core competency and competitive advantage against other machine manufacturers. The hydraulic control system 10 claimed herewith provides a platform for the end user to program their own control logic and state command profiles and state feedback algorithms and therefore, provides the machine manufacturer with the ability to protect their IP.

In addition to providing a freely programmable platform, the hydraulic control system claimed herewith also enables a "distributed control architecture" for multi axis control. On a typical machine there are several hydraulic axes that need to be controlled simultaneously. The current state of the art control architecture, hereafter referred to as a "centralized control architecture", consists of a single PLC that is responsible for coordinating the movements of all hydraulic axes. This necessitates the need of all sensor signals to be routed to the single machine PLC. This also necessitates the need for this single PLC to simultaneously run several state feedback, closed-loop control algorithms for all of the hydraulic axes. The single machine PLC then sends a command or manipulation to each hydraulic control valve. The drawbacks of a centralized control architecture are that it results in significant cost to rout cabling throughout the machine and significant wiring complexity in the PLC panel. Furthermore a costly, high end PLC is required to simultaneously coordinate all of the hydraulic axes and run the several state feedback control algorithms at a sufficient control rate to achieve required dynamic performance of each hydraulic axis.

As an improvement to a "centralized control architecture" the analog interfacing of all sensors and control valves with the PLC has been replaced by a fieldbus or network in some installations. This installation can reduce cabling cost and wiring complexity because several nodes can be connected to the PLC in a ring topology. The drawback to this variation of a centralized control architecture with digital communication between nodes and PLC is that control update rates are now limited by the bandwidth of the fieldbus or network. Considering that all nodes need to continuously broadcast their feedback values in the form of 8 to 16 bit words and considering that the PLC needs to continuously broadcast manipulations to the control valves in the form of 8 to 16 bit words means that the rate at which information can be transferred is limited by the constant bandwidth of the fieldbus or network. The end result is that the performance of the hydraulic axis suffers from the latency of manipulations received from the central controller.

The solution to these problems is to employ a "distributed control architecture" where the state feedback control algorithm for each hydraulic axis is executed locally on the hydraulic valve controlling that specific axis. The advantage of the "distributed control architecture" is that the sensors can be connected directly to the relevant hydraulic control valve and no longer take up valuable bandwidth on the fieldbus or network. Furthermore, the hydraulic control valve can generate its own command trajectory locally rather than needing to receive it from the central PLC which further reduces data transfer on the network or fieldbus. Since state-feedback control algorithms are embedded on the microprocessor 32 of the hydraulic controller 10, the control instructions can be executed and a much higher rate thereby significantly improving the dynamic performance of said hydraulic axis. Lastly, the responsibilities of the central PLC get significantly simplified allowing the use of a less complex and lower cost unit. The new central computer becomes a supervisory PLC that coordinates the movements of each hydraulic axis but no longer needs to continually monitor and continually manipulate each hydraulic axis. Instead the supervisory PLC would transmit a "Start Profile" bit to a distributed controller. The distributed controller would receive this "Start Profile" bit, then execute its profile then respond with a "Profile Complete" bit. The new supervisory PLC would monitor the state and fault status of each distributed controller and take appropriate action if any distributed controller raises a fault flag. The network or fieldbus communication traffic in a distributed control architecture gets reduced from the continuous broadcast of digital sensor words and digital manipulation words to the periodic broadcast of state and fault bits.

Now referring to FIG. 2, a schematic illustration showing the arrangement of modules in the control circuit board and various inputs and outputs are shown. The controller 11 has a first interface 113 to a global bus system 34 via which the control device 10 is connected to a higher order controller such as a supervisory PLC 60. The controller 11 has a second interface to a local bus system 33. Further devices and sensors for controlling additional cylinders or other actuators in each case are connected to this bus system 33 which can be through a network or field bus interface 113 as illustrated in FIG. 2. The bus systems 33 and 34 are connected to the circuit board 26 as illustrated in FIGS. 1. and 2. By replacing a circuit board component such as the network bus interface 113, the control device 10 can be connected in a simple way to different bus or network systems.

The controller 11 is connected to the supervisory PLC 60 via the global bus system 34. In this global bus system 34 the Supervisory PLC 60 is designated as the "master" and the valve controller 11 is designated as a "slave". A second bus system, designated as the local bus system 33, is provided for use when a hydraulic axis must be controlled by two or more hydraulic actuators 12B and hydraulic control valves 50. An example of this is in a press application where two hydraulic cylinders must follow an identical trajectory parallel to each other. In this case the controller 11 would be designated as a master and a second hydraulic control valve 50 would be designated as a slave node on the local bus system 33. The controller 11 would be responsible for controlling its own hydraulic control valve 10 and controller 11 would also be responsible for controlling the second hydraulic control valve 50. The local bus system is for example a CAN bus via the local bus 33. It connects the devices and possible further devices having proper communication capability to one another since the local and global bus 33, 34 permit the exchange of data between a plurality of devices. This exchange of data between the global bus system 34 and the local bus system 33 is enabled by the Expanded Object Dictionary Database 124. Via this data exchange, for example, synchronous control of the piston rods of two actuator cylinders can be implemented. The global bus system 34 connects the devices to the higher order controller such as the supervisory computer 60. It is used for communication between the individual devices and the supervisory computer 60. In FIG. 2, the supervisory computer 60 is illustrated as a programmable logic controller (PLC) but can also be implemented by a PC. Via the global bus system 34, the supervisory computer 60 can be supplied with the different actual values from the actuator 12, or from sensor data contained in the object dictionary database 124, or control valve state information or fault bits or diagnostic data for monitoring or control purposes.

The pressurized hydraulic fluid such as hydraulic oil, enters the actuator 12 through either hydraulic lines A and/or B whose flow rate and pressure is in response to the motion of the spool valve (not shown) in the control valve 16 based on a variety of sensor inputs and desired movement commands using algorithms supplied by either the manufacturer, the user or some third party provider. The controller 32 can be connected to a global or a local digital communication system or both. The global or local digital communication system can be a field bus such as a CAN or a network such as Ethernet. Connectors 33 and 34 are the shown illustrations of the electrical connections to the local and the global digital communication system respectively. Also illustrated are electrical connections 48 and 46 where the connector 48 can be used to flash program the microprocessor 32 and connector 46 can be connected to a variety of external sensors 42 such as displacement, pressure, temperature, or vibration sensors. Another approach to transfer external sensor data into the controller 11 is through a serial communication line using a system such as multiplexing to encode and then decode the serially sent sensor values using the microprocessor 32 or a separate communications device such as the A to D 123 or the SSI interface 126 shown in FIG. 2.

Now again referring to FIG. 2 of the drawings, an illustrative diagram of the controller 11 of the exemplary control device 10 is shown. The on-board application controller 103 is shown contained within the dashed box drawn in FIG. 2 and includes both a processor section 102 that handles the state feedback application control algorithm and a sequencing logic section 104 that handles both the sequencing logic and CNC command profiles.

In the exemplary control device 10, a software platform is provided so the application control algorithm can be programmed by the user but could instead be programmed by the manufacturer. The software platform also allows the user to program the sequencing logic and CNC profiles or can instead be programmed by the manufacturer.

The exemplary hydraulic control devices 10 uses a cascaded control architecture whereby the Sequencing Logic and NC controller 104 operates at the highest level. This controller's function is to receive "start profile" commands from the supervisory PLC 60 and transmit "profile complete" status to the supervisory PLC 60. The Sequencing Logic and NC controller 104 can also transmit other various status words to the supervisory PLC 60 such as the current state of the state machine or diagnostic or fault information. Lastly the Sequencing Logic and NC controller 104 provides the command profile and sequencing information to the next lower controller in the cascade which is the Application State Feedback controller 102.

The Application Controller 103 has read/write access to the Object Dictionary Database 124. This database is a repository for fetching sensed data written to it by the A/D 123 or SSI Interface 126. This database 124 is also a repository for storing status information to be broadcast by the network/fieldbus interface 113. The next lower controller in the cascade is the Application State Feedback controller 102. This controller's function is to execute software instructions at a rapid, fixed sample rate to execute real-time, state feedback control algorithms. The Application State Feedback controller 102 receives its command trajectory from the Sequencing Logic and NC controller 104 and receives the sensed state feedback parameters via the Object Dictionary Database 124. Based on these commands and feedbacks the Application State Feedback controller 102 calculates a manipulation to be passed to the next lower controller in the cascade. The Application State Feedback controller 102 can be programmed by the user or it can be pre-programmed by the manufacturer. The next lower controller in the cascade can be the control valve piston position controller 114 or the Control Valve Actuator Current Controller 116 or the Control Valve Actuator PWM controller 112. This selection is software selectable by the application controller 103 via a "Control Mode" parameter in Object Dictionary Database 124. This software selection of Control Mode is depicted as switch 110 in FIG. 2.

The position of switch 107 is selected by the processor section 102 such that either the flow controller 106 is connected to the switch 110 or the pressure controller 108 is connected to the switch 110. The control valve piston position controller 114 contains software logic to calculate and generate a current command based on the error between commanded piston position and actual piston position xi. This signal is transmitted to the current controller 116. The current controller 116 generates a PWM command signal based on the error between commanded current and sensed actuator current ia or ib. The PWM signals are sent to a Pulse Width Modulated (PWM) current driver 112. The PWM current driver 112 generates current ia and ib that is sinked through Electromagnetic Valve Actuator A 118 and B 120 to exert forces to move the control valve piston. The Electromagnetic Valve Actuators 118 and 120 determine the position of the control valve piston which in turn, controls the flow of pressurized hydraulic oil to the hydraulic actuator 52.

As an example, the Sequencing Logic and NC controller 104 would call either the flow control state feedback controller 106 or the pressure control state feedback 108 controller based on user programmed logic 104 to execute a pQ control application commonly used on injection molding machines. The Sequencing Logic and NC controller 104 would provide the selected state feedback controller with the user programmed flow command profile or pressure command profile while in said operating state. The output of the selected state feedback controller would be a manipulation to 114 116 or 112 based on the state of switch 110 to ultimately position the control valve spool.

In a like manner, additional hydraulic actuators could be controlled by the Application Controller 103 via slave valves 50 on the local field bus. If desired either the position controller 114 or the current controller 116 or both can be eliminated from the processing chain using a "software switch" through the selection of "Valve Control Mode" in the in the Object Dictionary Database 124. The state of this "software switch" as depicted as item 110 in FIG. 2 is controlled by the application controller 103. Using this mechanism the control signal generated by the application controller 104 can be fed to the Position Controller 114 or to the Current Controller 116 or directly to the PWM Current Driver 112.

To coordinate the high level motion of one distributed hydraulic axis 12A and 12B with other distributed hydraulic axes on the machine, a supervisory PLC computer 60 is connected to the global network bus line 34 which is in turn connected to the application controller 103. The user can program the application controller 103 to command the desired motion or performance of the hydraulic axis as directed by the supervisory PLC 60. The application controller 103 then generates a required control signal which is transmitted to the downstream controllers in the cascade 112, 114, 116 and to a slave hydraulic control valve 50 via the local bus network connection 33 in the case of synchronous axis control. Two actuators are shown in this example although one or a plurality of actuators could be used with the exemplary system.

The motion of the actuators 12A and 12B are of a closed loop control through use of the application controller 103 where a selection of sensors is used to provide the closed loop control input. Shown in FIG. 5 1, item 25 and in FIG. 2 item 130 are pressure sensors comprised of sensors Pa and Pb for the measurement of the work port pressures from the control valve 10 to its respective actuator 12. Pressure sensor Ps measures the pressure of the high pressure fluid supply line and pressure sensor Pt measures the fluid level in a return tank (not shown). Sensor Vp measures the position of a second stage control valve spool (not shown) while sensor Cp measures the position of the hydraulic actuator piston 12. It is recognized that to provide maximum flexibility for a user to program their own control logic and algorithms into the application controller 103 that additional sensor data may be required. For this purpose an external sensor interface 125 has been provided to pass externals sensor data into the controller 11. This external sensor data becomes available to the application controller 103 through read access to the Expanded Object Dictionary Database 103.

An expanded object dictionary 124 is connected to the A to D 123, to the network bus interface 113 to the application controller 103 and to an SSI interface 126. The SSI interface 126 acts to pass signals from external digital sensors (not shown) to the object dictionary 124 unlike the A to D 123 which digitizes signals from external analog sensors 130. The object dictionary 124 can include information and other data such as calibration settings, sensor parameters, diagnostic flags, control algorithm parameters, gain tables, signal thresholds and dead bands.

Now referring to FIG. 3 of the drawings, a schematic illustration of the controller 17 connected to a series of slave actuators is shown. A circuit board 11 contains a variety of electronic components such as a microprocessor 32 and interface modules. The local communication signal line 33A is connected to the local communication field bus or network such as a CAN bus or Ethernet network. The global communication signal line 34 is connected to a global communication field bus or network such as CAN or ethernet. The microprocessor 32 can be an Application Specific Integrated Circuit (ASIC) microchip or a similar device that provides the signal processing and algorithm support required to generate a variety of signals such as the control signal that is sent to the hydraulic control valve 16 and the slave hydraulic control valves 50A and S0B A variety of hydraulic control valves are shown in FIG. 3 connected to controller 11 as nodes 50A and 50B on a bus or network communication system 33. Controller 11 is designated as the "master" and the additional hydraulic control valves are designated as slaves. Each hydraulic control valve 10, 50A and 50B is also connected to a cylinder actuator 12A, 12B, and 12C via hydraulic connections. Each cylinder actuator is instrumented with a sensor 23A, 23B, and 23C for sensing the position and/or speed of the actuator piston. Each actuator sensor is connected to the controller 11 via interface 56A, 56B, and 56C. Interface 56A, 56B, and 56C can be an analog interface or a digital interface such as SSI or a discrete interface such as output by and encoder. The actuator sensors 23A, 23B, and 23C can also be interfaced to the controller 11 as additional slave nodes on the local network or bus system 33. In this fashion controller 11 can control the hydraulic actuator 12A controlled by the hydraulic control valve 10 that controller 11 resides within and one or more additional hydraulic actuators 12B and 12C. The control logic and state feedback algorithms for each hydraulic actuator can be programmed into controller 11 by the user as described herein.

Now again referring to FIG. 3 of the drawings, a schematic illustration of the exemplary hydraulic control system 11 is shown where the controller 17 is used to send control signals to at least one slave control valve unit such as control valves 50A, 50B. The controller 17 is electrically connected to the local bus 33 which can be what is known as a CAN bus which has been discussed previously. Electrical communication signals are sent over the local bus 33 which is connected to each of the slave control valves 50A, 50B. The signals sent are encoded so that the proper slave actuator 50A and 50B only responds to its slave control signal. The slave control signal represents a variable such as a desired cylinder position or control valve position or a pressure level or a force level, for example. The variables associated with the performance of the slave actuators are transmitted by way of the communication lines 56A, 56B and 56C which are connected to the sensor at each of the actuators 23A, 23B, and 23B which sense movement of the hydraulic cylinders 12A, 12B, and 12C. The signals from the sensors are then transmitted to the controller 17 where they are processed and a new control signal is sent via the local bus line 33 to the control valves 10, 50A, 50B. The position of the hydraulic cylinders 12A, 12B, and 12C are transmitted to the controller 17 through slave communication lines 56A, 56B and 56C. The amplitudes of the signals produced by the sensors can be coded and multiplexed or the sensors such as the actuator sensors 23A, 23B, and 23B can be directly connected to the controller 17.

The controller 17 is electronically communicates with a central supervisory computer 60 which can be a PLC, through a global bus communication line 34. The supervisory computer 60 can be programmed to regulate the master hydraulic control device 10' and in turn, the performance of the slave actuators which respond to control signals generated by the master control device 10' and specifically by the microprocessor 32. For example, the user can program a request that the movement of the master and slave actuators 12A-C move in sequence. The microprocessor 32, which has been flash programmed by the user, then generates control signals that are sent to the master control valve 10 and to each of the slave hydraulic control valves 50A and 50B to generate the desired motion of the actuators 12A, 12B and 12C. In this fashion a single controller 11 can work in a distributed control architecture to control a distributed function on a machine requiring two or more hydraulic control valves. Examples of distributed, multi-control valve functions include but are not limited to the following applications:

Synchronous axis control (master/slave)
Twin spool Meter in/Meter out control (master/slave)
Parallel flow control
Distributed Control of safety shutoff(s)

The master hydraulic control valve 17 acts as a slave on the global network or fieldbus interface 34 which is mastered by the supervisory PLC 60. The supervisory PLC 60 monitors and coordinates other distributed controllers on the machine such as 17, 17', 17".

This disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. A hydraulic actuator control system for controlling the motion of a master actuator and a slave actuator comprising:
    an external supervisory computer for sending distributed command signals;
    a hydraulic control system connected to said master actuator and connected to, but separate from, said supervisory computer, said hydraulic control system including a microprocessor and a master hydraulic control valve for controlling the flow of a pressurized fluid to said master actuator based on said distributed command signals; and
    at least one slave actuator having at least one slave sensor connected to said microprocessor and having at least one slave control valve for controlling the flow of pressurized fluid to said at least one slave actuator, where said at least one slave control valve and said at least one slave sensor are controlled by said microprocessor;
    wherein the external supervisory computer sends said distributed control command signals to the hydraulic control system, and said supervisory computer monitors an operational state of said microprocessor, but does not monitor said at least one slave actuator and does not manipulate said at least one slave control valve, and where said microprocessor executes a closed loop control algorithm that generates a slave control command signal in response to said distributed control command signals;
    wherein said microprocessor is further configured to transmit said slave control valve command signal to said at least one slave control valve, wherein said at least one slave control valve is configured to move in response to receiving said slave control valve command signal so as to allow pressurized fluid to enter said at least one slave actuator to cause said at least one slave actuator to move, thereby causing said at least one slave sensor to transmit a slave control signal indicating a changed position of said at least one slave actuator to said microprocessor, and not to said supervisory computer during operation of said supervisory computer, for use in the closed loop control algorithm executed by said microprocessor.

2. The hydraulic actuator control system of claim 1, wherein said microprocessor includes an application control algorithm that is programmable by a user.

3. The hydraulic actuator control system of claim 1, further comprising a network bus interface connected to said microprocessor and connected to said at least one slave actuator, wherein the at least one slave actuator receives commands via said network bus interface from said microprocessor.

4. The hydraulic actuator control system of claim 1, further comprising a flow controller and a pressure controller where said microprocessor selects to use either said flow controller or said pressure controller.

5. The hydraulic actuator control system of claim 1, further comprising an analog to digital converter, said analog to digital converter connected to said microprocessor and to at least one external sensor and configured to digitize signals from said at least one external sensor.

6. The hydraulic actuator control system of claim 1, further comprising a local communication bus connected to said microprocessor and to at least one of said at least one slave sensor and said at least one slave control valve, and a global communication bus connected to said microprocessor and to said supervisory controller.

7. The hydraulic actuator control system of claim 1, wherein the microprocessor is further configured to:
    generate a second slave control valve command signal in response to said distributed command signals received from said supervisory computer; and
    transmit said second slave control valve command signal to a second slave control valve;
    wherein said second slave control valve is configured to move in response to receiving said second slave control valve command signal so as to allow pressurized fluid to enter a second slave actuator to cause said second slave actuator to move, thereby causing a second slave valve sensor to transmit a second slave control signal indicating a changed position to said microprocessor, and not to said supervisory computer, for use in a second closed loop control algorithm executed by said microprocessor.

8. A device for controlling the motion of a master actuator and at least one slave actuator comprising:
an external supervisory computer;
a controller including a programmable microprocessor and database connected to a master hydraulic control valve, said controller in communication with said master actuator and the external supervisory computer configured to send distributed command signals to said controller, wherein said master hydraulic control valve controls the flow of a pressurized fluid to said master actuator based on said distributed command signals; and
a slave actuator having a slave sensor in communication with said controller and having a slave control valve for controlling the flow of pressurized fluid to said slave actuator, where said slave control valve and said slave sensor are controlled by said microprocessor;
wherein said external supervisory computer monitors said controller but does not monitor said slave actuator and does not manipulate said slave control valve; and
wherein said controller is configured to generate a slave control valve command signal in response to said distributed command signals received from said external supervisory computer, and transmit said slave control valve command signal to said slave control valve, wherein said slave control valve is configured to move in response to receiving said slave control valve command signal so as to allow pressurized fluid to enter said slave actuator causing said slave actuator to move, thereby causing said slave sensor to transmit a slave control signal indicating a changed position of said slave actuator to said controller, and not to said external supervisory computer during operation of said external supervisory computer, for use in a closed loop control algorithm executed by said controller.

9. The device of claim 8, wherein the microprocessor includes an application control heuristic that is programmable by a user.

10. The device of claim 8, further comprising a network bus interface connected to said microprocessor and to said slave actuator, wherein said slave actuator selectively receives commands via the network bus interface from said microprocessor.

11. The device of claim 8, wherein the controller includes a flow controller and a pressure controller where the microprocessor is configured to select either said flow controller or said pressure controller.

12. The device of claim 8, further comprising at least one external sensor in communication with an analog to digital converter, said analog to digital converter connected to said microprocessor and configured to digitize signals from said at least one external sensor.

13. The device of claim 8, wherein said external supervisory computer monitors an operation state of said controller without monitoring said slave actuator or a fluid therein.

14. A method of controlling a master actuator and a slave actuator, comprising:
generating distributed command signals via an external supervisory computer;
receiving said distributed command signals by a controller having a microprocessor and a database, said microprocessor programmable with control algorithms;
communicating, via said controller, with a master hydraulic valve for controlling the flow of a pressurized fluid to said master actuator based on said distributed command signals;
monitoring at least one slave actuator via at least one slave sensor, said at least one slave sensor coupled to at least one slave control valve for managing the flow of pressurized fluid to said at least one slave actuator, where said at least one slave control valve and said at least one slave sensor are controlled by said microprocessor; and
sending, via the controller, a slave control valve command signal to said at least one slave control valve in response to said distributed command signals received from said external supervisory computer, causing said at least one slave control valve to move, thus allowing pressurized fluid to enter said at least one slave actuator and causing said at least one slave actuator to move, the movement of said at least one slave control valve causing said at least one slave sensor to transmit a slave control signal indicating a changed position of said at least one slave actuator to said controller, and not to said external supervisory computer during operation of said external supervisory computer, for use in a closed loop control algorithm executed by said controller;
wherein said external supervisory computer monitors said controller but does not monitor said at least one slave actuator and does not manipulate said at least one slave control valve.

15. The method of claim 14, further comprising monitoring, via said external supervisory computer, an operational state of said controller without monitoring said at least one slave actuator or fluid therein.

16. The method of claim 14, wherein said controller communicates with at least one of said at least one slave control valve and said at least one slave sensor via a local bus interface.

17. The method of claim 14, wherein said controller communicates with said external supervisory computer via a global bus interface.

18. The method of claim 14, further comprising:
generating, via the microprocessor, a second slave control valve command signal in response to the distributed command signals received from the supervisory computer; and
the controller sending said second slave control valve command signal to a second slave control valve, wherein said second slave control valve moves in response to receiving said second slave control valve command signal so as to allow pressurized fluid to enter a second slave actuator causing said second slave actuator to move, the movement of said second slave control valve causing a second slave valve sensor to transmit a second slave valve control signal indicating a changed position of said second slave actuator to said microprocessor, and not to said external supervisory computer, for use in a second closed loop control algorithm.

19. The method of claim 14, further comprising programming by a user at least a subset of the control algorithms.

* * * * *